(12) United States Patent
Menezes

(10) Patent No.: US 6,883,916 B2
(45) Date of Patent: Apr. 26, 2005

(54) PROGRESSIVE ADDITION LENSES

(75) Inventor: Edgar V. Menezes, Roanoke, VA (US)

(73) Assignee: Johnson & Johnson Vision care, Inc., Jacksonville, FL (US)

(*) Notice: Subject to any disclaimer, the term of this patent is extended or adjusted under 35 U.S.C. 154(b) by 0 days.

(21) Appl. No.: 10/726,735

(22) Filed: Dec. 3, 2003

(65) Prior Publication Data
US 2004/0080711 A1 Apr. 29, 2004

Related U.S. Application Data

(62) Division of application No. 09/832,236, filed on Apr. 10, 2001, now Pat. No. 6,709,105.

(51) Int. Cl.⁷ .............................. G02C 7/02; G02C 7/06
(52) U.S. Cl. ........................................ 351/177; 351/169
(58) Field of Search ................................ 351/169, 168, 351/170–172, 177

(56) References Cited

U.S. PATENT DOCUMENTS 6,019,470 A * 2/2000 Mukaiyama et al. ....... 351/169
6,074,062 A    6/2000 Morris et al. ............... 351/169
6,139,148 A * 10/2000 Menezes ..................... 351/169

FOREIGN PATENT DOCUMENTS

EP      1-026-533    *  8/2000
JP      2000-249992  *  9/2000

* cited by examiner

Primary Examiner—Jordan M. Schwartz
(74) Attorney, Agent, or Firm—Lois Gianneschi

(57) ABSTRACT

The present provides progressive addition lens designs and lenses in which unwanted lens astigmatism is reduced as compared to conventional progressive addition lenses. The lenses of the invention containing at least one surface that is a composite of a progressive surface design and a regressive surface design.

9 Claims, 9 Drawing Sheets ically, in both designs the unwanted lens astigmatism at or near its approximate center reaches a maximum that corresponds approximately to the near vision dioptric add power of the lens.

PROGRESSIVE ADDITION LENSES

FIELD OF THE INVENTION

The application is a division of U.S. Ser. No. 09/832,236 filed Apr. 10, 2001, issued as U.S. Pat. No. 6,709,105 on Mar. 23, 2004. The present invention relates to multifocal ophthalmic lenses. In particular, the invention provides progressive addition lenses in which unwanted astigmatism is reduced as compared to conventional progressive addition lenses.

BACKGROUND OF THE INVENTION

The use of ophthalmic lenses for the correction of ametropia is well known. For example, multifocal lenses, such as progressive addition lenses ("PAL's"), are used for the treatment of presbyopia. The progressive surface of a PAL provides far, intermediate, and near vision in a gradual, continuous progression of vertically increasing dioptric power from far to near focus, or top to bottom of the lens.

PAL's are appealing to the wearer because PAL's are free of the visible ledges between the zones of differing dioptric power that are found in other multifocal lenses, such as bifocals and trifocals. However, an inherent disadvantage in PAL's is unwanted astigmatism, or astigmatism introduced or caused by one or more of the lens' surfaces. In hard design PAL's, the unwanted astigmatism borders the lens channel and near vision zone. In soft design PAL's, the unwanted astigmatism extends into the distance vision zone. Generally, in both designs the unwanted lens astigmatism at or near its approximate center reaches a maximum that corresponds approximately to the near vision dioptric add power of the lens.

Many PAL designs are known that attempt to reduce unwanted astigmatism with varying success. One such design is disclosed in U.S. Pat. No. 5,726,734 and uses a composite design that is computed by combining the sag values of a hard and a soft PAL design. The design disclosed in this patent is such that the maximum, localized unwanted astigmatism for the composite design is the sum of the contributions of the hard and soft designs areas of maximum, localized unwanted astigmatism. Due to this, the reduction in the maximum, localized unwanted astigmatism that may be realized by this design is limited. Therefore, a need exists for a design that permits even greater reductions of maximum, localized unwanted astigmatism than in prior art designs.

DESCRIPTION OF THE INVENTION AND ITS PREFERRED EMBODIMENTS

In the present invention, a composite surface is formed by combining the designs of a progressive and a regressive surface. It is a discovery of the invention that progressive lenses with reduced unwanted astigmatism may be constructed by combining progressive addition and regressive surfaces into a composite surface.

In one embodiment, the invention provides a method for designing a progressive addition surface comprising, consisting of, and consisting essentially of: a.) designing a progressive surface having at least one first area of unwanted astigmatism; b.) designing a regressive surface having at least one second area of unwanted astigmatism; and c.) combining the progressive surface and regressive surface designs to form a composite progressive surface design, wherein the at least one first and second areas of unwanted astigmatism are aligned. In another embodiment, the invention provides a progressive addition lens comprising, consisting essentially of, and consisting of a surface of the composite surface design produced by this method.

By "lens" or "lenses" is meant any ophthalmic lens including, without limitation, spectacle lenses, contact lenses, intraocular lenses and the like. Preferably, the lens of the invention is a spectacle lens.

By "progressive addition surface" is meant a continuous, aspheric surface having distance and near viewing or vision zones, and a zone of increasing dioptric power connecting the distance and near zones. One ordinarily skilled in the art will recognize that, if the progressive surface is the convex surface of the lens, the distance vision zone curvature will be less than that of the near zone curvature and if the progressive surface is the lens' concave surface, the distance curvature will be greater than that of the near zone.

By "area of unwanted astigmatism" is meant an area on the lens surface having about 0.25 diopters or more of unwanted astigmatism.

By "regressive surface" is meant a continuous, aspheric surface having zones for distance and near viewing or vision, and a zone of decreasing dioptric power connecting the distance and near zones. If the regressive surface is the convex surface of the lens, the distance vision zone curvature will be greater than that of the near zone and if the regressive surface is the lens' concave surface, the distance curvature will be less than that of the near zone.

By "aligned" in relation to the areas of unwanted astigmatism is meant that the areas of unwanted astigmatism are disposed so that there is partial or substantially total superposition or coincidence when the surface are combined to form the composite surface.

Figure 1:
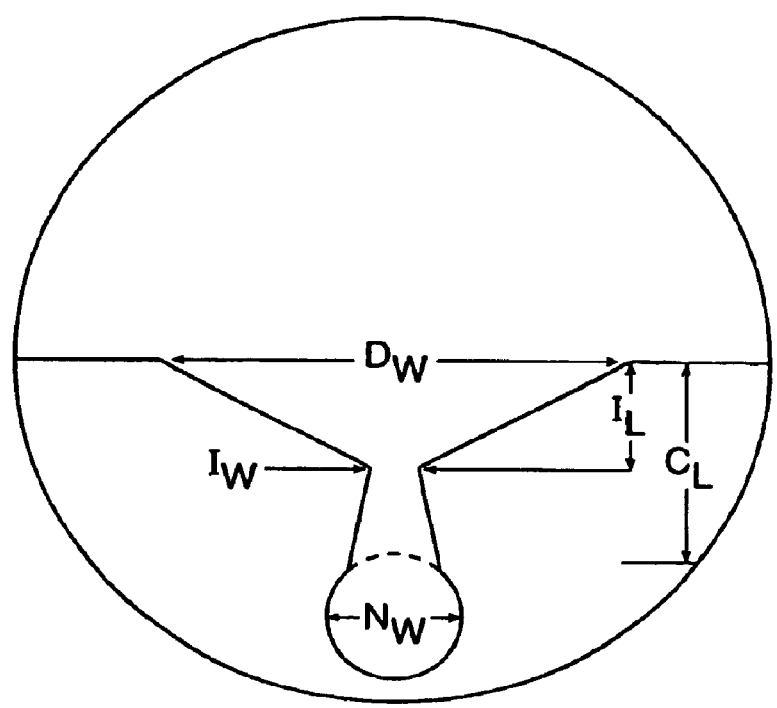
FIG. 1 is an illustration of the distortion area of a progressive lens.

A number of optical parameters conventionally are used to define and optimize a progressive design. These parameters include areas of unwanted astigmatism, areas of maximum, localized unwanted astigmatism, channel length and width, distance and reading zone widths, reading power width, and normalized lens distortion. Normalized lens distortion is the integrated, unwanted astigmatism of the lens below the optical center, primary reference point, divided by the dioptric add power of the lens. Referring to FIG. 1, for progressive addition lenses, the normalized lens distortion, $D_L$ can be calculated by the equation:

$$D_L = M_A/(3A_P)\{A_L/2 - A_1 - \pi N_W^2/4\} \quad (I)$$

wherein: $A_L$ is the lens area; $N_W$ is the near width; $M_A$ is the maximum, localized, unwanted astigmatism (the highest, measurable level of astigmatism in an area of unwanted astigmatism on a lens surface); and $A_P$ is the dioptric power of the lens at y=−20 mm below the primary reference point. $A_1$ is the area of the intermediate zone where the unwanted astigmatism is less than 0.5 diopters and is calculated by the equation:

$$A_1 = I_L/2[I_W + D_W] + (C_L - I_L)/2[I_W + N_W] \quad (II)$$

where: $I_W$ is width of the intermediate zone where the unwanted astigmatism is less than 0.5 diopters; $D_W$ and $N_W$ are the widths of the distance (at y=0) and near (at y=−20 mm) viewing zones, respectively, where the unwanted astigmatism is less than about 0.5 diopters; and $I_L$ is the length along the center of the channel between the prism reference point and the narrowest width in the intermediate zone.

For purposes of Equation II, the near width and intermediate widths are not synonymous with reading and channel width. Rather, whereas reading and channel width are defined based on clinically relevant threshold for good vision, the near and intermediate widths of Equation II are based on a 0.5 diopter astigmatic threshold.

In the lenses of the invention, the normalized lens distortion is significantly reduced compared to conventional progressive addition lenses. Thus, in a preferred embodiment, the invention provides progressive addition lenses comprising, consisting essentially of, and consisting of at least one progressive addition surface having a normalized lens distortion of less than about 300.

In the lenses of the invention, the dioptric add power, or the amount of dioptric power difference between the distance and near vision zones, of the progressive surface design is a positive value and that of the regressive surface design, a negative value. Thus, because the add power of the composite surface is the sum of the progressive and regressive surface designs' dioptric add powers, the regressive surface design acts to subtract dioptric add power from the progressive surface design.

It is known that a progressive addition surface produces unwanted astigmatism at certain areas on the surface. The unwanted astigmatism of an area may be considered a vector quantity with a magnitude and axis of orientation that depends, in part, on the location of the astigmatism on the surface. A regressive surface also has areas of unwanted astigmatism, the magnitude and axis of the regressive surface astigmatism are determined by the same factors that are determinative for the progressive surface astigmatism. However, the axis of the regressive surface astigmatism typically is orthogonal to that of the progressive surface astigmatism. Alternately, the magnitude of the regressive surface astigmatism may be considered to be opposite in sign to that of the progressive surface astigmatism at the same axis.

Thus, combining a progressive surface design with an area of unwanted astigmatism with a regressive surface design with a comparably located area of unwanted astigmatism reduces the total unwanted astigmatism for that area when the two designs are combined to form a composite surface of a lens. The reason for this is that the unwanted astigmatism of the lens at a given location will be the vector sums of the unwanted astigmatisms of the progressive and regressive surface designs. Because the magnitudes of the progressive addition and regressive surface designs' astigmatisms have opposite signs, a reduction in the total unwanted astigmatism of the composite surface is achieved. Although the axis of orientation of the unwanted astigmatism of the regressive surface design need not be the same as that at a comparable location on the progressive surface design, preferably the axes are substantially the same so as to maximize the reduction of unwanted astigmatism.

At least one area of astigmatism of the progressive surface design must be aligned with one area of astigmatism of the regressive surface design to achieve a reduction of unwanted astigmatism in the composite surface. Preferably, the areas of maximum, localized unwanted astigmatism, or the areas of highest, measurable unwanted astigmatism, of each of the surface designs are aligned. More preferably, all areas of unwanted astigmatism of one surface design are aligned with those of the other.

In another embodiment, the surfaces' distance and near zones, as well as the channels are aligned. By aligning the surfaces in such a manner, one or more areas of unwanted astigmatism of the progressive surface design will overlap with one or more such areas on the regressive surface design. In another embodiment, the invention provides a surface of a lens comprising, consisting essentially of, and consisting of one or more progressive addition surface designs and one or more regressive surface designs, wherein the distance vision zones, near vision zones and channels of the progressive and regressive surface designs are substantially aligned.

In the lenses of the invention, the composite surface may be on the convex, concave, or both surfaces of the lens or in layers between these surfaces. In a preferred embodiment, the composite surface forms the convex lens surface. One or more progressive addition and regressive surface designs may be used in the composite surface, but preferably only one of each surface is used. In embodiments in which a composite surface is the interface layer between the concave and convex surfaces, preferably the materials used for the composite surface is of a refractive index that differs at least about 0.01, preferably at least 0.05, more preferably at least about 0.1.

One ordinarily skilled in the art will recognize that the progressive addition and regressive surface designs useful in the invention may be either of a hard or soft design type. By hard design is meant a surface design in which the unwanted astigmatism is concentrated below the surface's optical centers and in the zones bordering the channel. A soft design is a surface design in which the unwanted astigmatism is extended into the lateral portions of the distance vision zone. One ordinarily skilled in the art will recognize that, for a given dioptric add power, the magnitude of the unwanted astigmatism of a hard design will be greater than that of a soft design because the unwanted astigmatism of the soft design is distributed over a wider area of the lens.

In the lens of the invention, preferably, the progressive addition surface designs are of a soft design and the regressive surface designs are of a hard design. Thus, in yet another embodiment, the invention provides a lens surface comprising, consisting essentially of, and consisting of a one or more progressive addition surface designs and one or more regressive surface designs, wherein the one or more progressive addition surface designs are soft designs and the one or more regressive surface designs are hard designs. More preferably, the progressive addition surface design has a maximum unwanted astigmatism that is less in absolute magnitude than the surfaces' dioptric add power and, for the regressive surface design, is greater in absolute magnitude.

The composite progressive surface of the invention is provided by first designing a progressive addition and a regressive surface. Each of the surfaces is designed so that, when combined with the design of the other surface or surfaces to form the composite progressive surface, substantially all of the areas of maximum, localized unwanted astigmatism are aligned. Preferably, each surface is designed so that the maxima of the unwanted astigmatism areas are aligned and when the surfaces' designs are combined to obtain the composite surface design, the composite surface exhibits maximum, localized unwanted astigmatism that is at least less than about 0.125 diopters, preferably less than about 0.25 diopters, than the sum of absolute value of the maxima of the combined surfaces.

More preferably, each of the progressive and regressive surfaces is designed so that, when combined to form the composite surface, the composite surface has more than one area of maximum, localized unwanted astigmatism on each side of the composite surface's channel. This use of multiple maxima further decreases the magnitude of the areas of unwanted astigmatism on the composite surface. In a more preferred embodiment, the areas of maximum, localized unwanted astigmatism of the composite surface form plateaus. In a most preferred embodiment, the composite surface has more than one area of maximum, localized unwanted astigmatism in the form of plateaus on each side of the composite surface's channel.

Designing of the progressive and regressive surfaces used to form the composite surface design is within the skill of one of ordinary skill in the art using any number of known design methods and weighting functions. Preferably, however, the surfaces are designed using a design method that divides the surface into a number of sections and provides a curved-surface equation for each area as, for example, is disclosed in U.S. Pat. No. 5,886,766, incorporated herein in its entirety by reference.

The surface designs useful in the lenses of the invention may be provided by using any known method for designing progressive and regressive surfaces. For example, commercially available ray tracing software may be used to design the surfaces. Additionally, optimization of the surfaces may be carried out by any known method.

In optimizing the designs of the individual surfaces or the composite surface, any optical property may be used to drive the optimization. In a preferred method, the near vision zone width, defined by the constancy of the spherical or equivalent spherocylindrical power in the near vision zone may be used. In another preferred method, the magnitude and location of the peaks or plateaus of the maximum, localized unwanted astigmatism may be used. Preferably, for purposes of this method, the location of the peaks and plateaus is set outside of a circle having an origin at x=0, y=0, or the fitting point, as its center and a radius of 15 mm.

More preferably, the x coordinate of the peak is such that $|x|>12$ and the $y<-12$ mm.

Optimization may be carried out by any convenient method known in the art. Additional properties of a specific lens wearer may be introduced into the design optimization process, including, without limitation, variations in pupil diameter of about 1.5 to about 5 mm, image convergence at a point about 25 to about 28 mm behind the front vertex of the surface, pantoscopic tilt of about 7 to about 20 degrees, and the like, and combinations thereof.

The progressive and regressive surface designs used to form the composite progressive surface may be expressed in any of a variety of manners, including and preferably as sag departures from a base curvature, which may be either a concave or convex curvature. Preferably, the surfaces are combined on a one-to-one basis meaning that the sag value $Z_1$ at point (x, y) of a first surface is added to the sag value $Z_2$ at the same point (x, y) on a second surface. By "sag" is meant the absolute magnitude of the z axis distance between a point on a progressive surface located at coordinates (x, y) and a point located at the same coordinates on a reference, spherical surface of the same distance power.

More specifically in this embodiment, following designing and optimizing of each surface, the sag values of the surfaces are summed to obtain the composite surface design, the summation performed according to the following equation:

$$Z(x, y)=\Sigma a_i Z_i(x, y) \qquad (III)$$

wherein Z is the composite surface sag value departure from a base curvature at point (x, y), $Z_i$ is the sag departure for the ith surface to be combined at point (x, y) and $a_i$ are coefficients used to multiply each sag table. Each of the coefficients may be of a value between about −10 and about +10, preferably between about −5 to about +5, more preferably between about −2 and about +2. The coefficients may be chosen so as to convert the coefficient of highest value to about + or −1, the other coefficients being scaled appropriately to be less than that value.

It is critical to perform the sag value summation using the same coordinates for each surface so that the distance and near powers desired for the composite surface are obtained. Additionally, the summation must be performed so that no unprescribed prism is induced into the composite surface. Thus, the sag values must be added from the coordinates of each surface using the appropriate coordinate systems and origins. Preferably, the origin from which the coordinate system is based will be the prism reference point of the surface, or the point of least prism. It is preferable to calculate the sag values of one surface relative to the other along a set of meridians by a constant or a variable magnitude before performing the summation operation. The calculation may be along the x-y plane, along a spherical or aspherical base curve, or along any line on the x-y plane. Alternatively, the calculation may be a combination of angular and linear displacements to introduce prism into the lens.

The distance and near vision powers for the progressive and regressive surface designs are selected so that, when the designs are combined to form the composite surface, the powers of the lens are those needed to correct the wearer's visual acuity. The dioptric add power for the progressive addition surface designs used in the invention each independently may be about +0.01 to about +6.00 diopters, preferably about +1.00 diopters to about +5.00 diopters, and more preferably about +2.00 diopters to about +4.00 diopters. The dioptric add power of the regressive surface designs are each independently may be about −0.01 to about −6.00, preferably about −0.25 to about −3.00 diopters, and more preferably about −0.50 to about −2.00 diopters.

In the case in which more than one composite progressive surface is used to form the lens, or the composite surface used in combination with one or more progressive surface, the dioptric add power of each of the surfaces is selected so that the combination of their dioptric add powers results in a value substantially equal to the value needed to correct the lens wearer's near vision acuity. The dioptric add power of each of the surfaces may be from about +0.01 diopters to about +3.00 diopters, preferably from about +0.50 diopters to about +5.00 diopters, more preferably about +1.00 to about +4.00 diopters. Similarly, the distance and near dioptric powers for each surface are selected so that the sum of the powers is the value needed to correct the wearer's distance and near vision. Generally, the distance curvature for each surface will be within the range of about 0.25 diopters to about 8.50 diopters. Preferably, the curvature of the distance zone of a concave surface may be about 2.00 to about 5.50 diopters and for a convex surface, about 0.5 to about 8.00 diopters. The near vision curvature for each of the surfaces will be about 1.00 diopters to about 12.00 diopters.

Other surfaces, such as spheric, toric, aspheric and atoric surfaces, designed to adapt the lens to the ophthalmic prescription of the lens' wearer may be used in combination with, or in addition to, the composite progressive addition surface. Additionally, the individual surfaces each may have a spherical or aspherical distance vision zone. The channel, or corridor of vision free of unwanted astigmatism of about 0.75 or greater when the eye is scanning from the distance to the near zone and back, may be short or long. The maximum, localized unwanted astigmatism may be closer to the distance or near viewing zone. Further, combinations of any of the above variations may be used.

In a preferred embodiment, the lens of the invention has a convex composite and concave progressive addition surfaces. The convex composite surface may be a symmetric or asymmetric soft design with an aspherical distance viewing zone and a channel length of about 10 to about 20 mm. The maximum, localized unwanted astigmatism is located closer to the distance than the near viewing zone and preferably is on either side of the channel. More preferably, the maximum, localized unwanted astigmatism is superior to the point on the surface at which the dioptric add power of the surface's channel reaches about 50 percent of the surface's dioptric add power. The distance viewing zone is aspherized to provide additional plus power to the surface of up to about 2.00 diopters, preferably up to about 1.00 diopters, more preferably up to about 0.50 diopters. Aspherization may be outside of a circle centered at the fitting point and having a radius of about 10 mm, preferably about 15 mm, more preferably about 20 mm.

The concave progressive surface of this embodiment is an asymmetrical, and preferably an asymmetrical, hard design, with a spherical distance viewing zone and channel length of about 12 to about 22 mm. The distance viewing zone is designed to provide additional plus power of less than about 0.50 diopters, preferably less than about 0.25 diopters. The maximum, localized unwanted astigmatism is located closer to the near viewing zone, preferably on either side of the lower tow-thirds of the channel.

In yet another embodiment, the lens of the invention has a convex composite surface and concave regressive surface. In still another embodiment, the lens has a convex composite surface, a regressive surface as an intermediate layer, and a spherocylindrical concave surface. In yet another embodiment, the convex surface is the composite surface, a regressive surface is an intermediate layer and the concave surface is a conventional progressive addition surface. In all embodiments it is critical that the distance, intermediate and near viewing areas of all surfaces align so as to be free of unwanted astigmatism.

The lenses of the invention may be constructed of any known material suitable for production of ophthalmic lenses. Such materials are either commercially available or methods for their production are known. Further, the lenses may be produced by any conventional lens fabrication technique including, without limitation grinding, whole lens casting, molding, thermoforming, laminating, surface casting, or combinations thereof. Preferably, the lens is fabricated by first producing an optical preform, or lens with a regressive surface. The preform may be produced by any convenient means including, without limitation injection or injection-compression molding, thermoforming, or casting. Subsequently, at least one progressive surface is cast onto the preform. Casting may be carried out by any means but preferably is performed by surface casting including, without limitation, as disclosed in U.S. Pat. Nos. 5,147,585, 5,178,800, 5,219,497, 5,316,702, 5,358,672, 5,480,600, 5,512,371, 5,531,940, 5,702,819, and 5,793,465 incorporated herein in their entireties by reference.

The invention will be clarified further by a consideration of the following, non-limiting examples.

EXAMPLES

Example 1

Figure 2A:
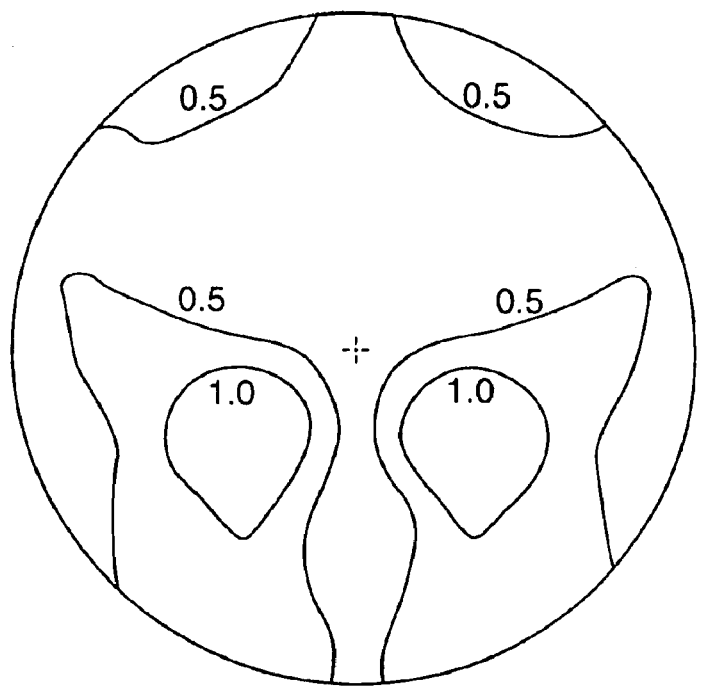
FIG. 2a is a cylinder contour of the progressive surface used in the lens of Example 1.
Figure 2B:
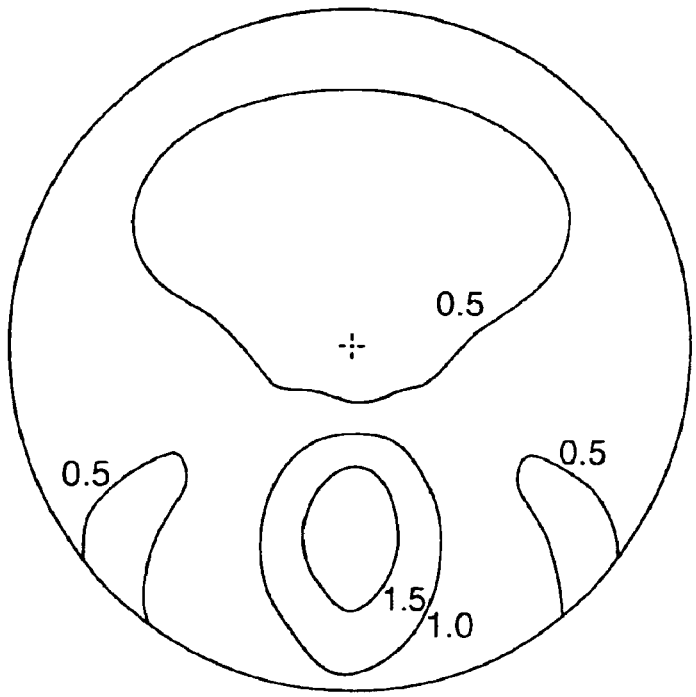
FIG. 2b is a power contour of the progressive surface used in the lens of Example 1.

A soft design, convex progressive addition surface was produced as a sag table wherein $Z_1$ denoted the sag value departure from a base curvature of 5.23 diopters for the distance zone. In FIGS. 2a and 2b are depicted the cylinder and power contours for this surface. The add power was 1.79 diopters with a channel length of 13.3 mm and maximum, localized, unwanted astigmatism of 1.45 diopters at x=−8 mm and y=−8 mm. The prism reference point used was x=0 and y=0 and the refractive index ("RI") was 1.56.

Figure 3A:
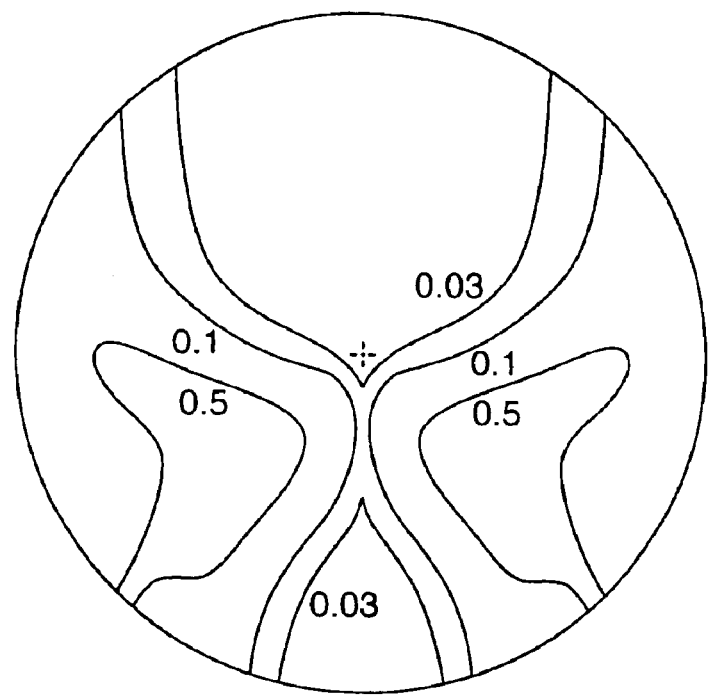
FIG. 3a is a cylinder map of the regressive surface used in the lens of Example 1.
Figure 3B:
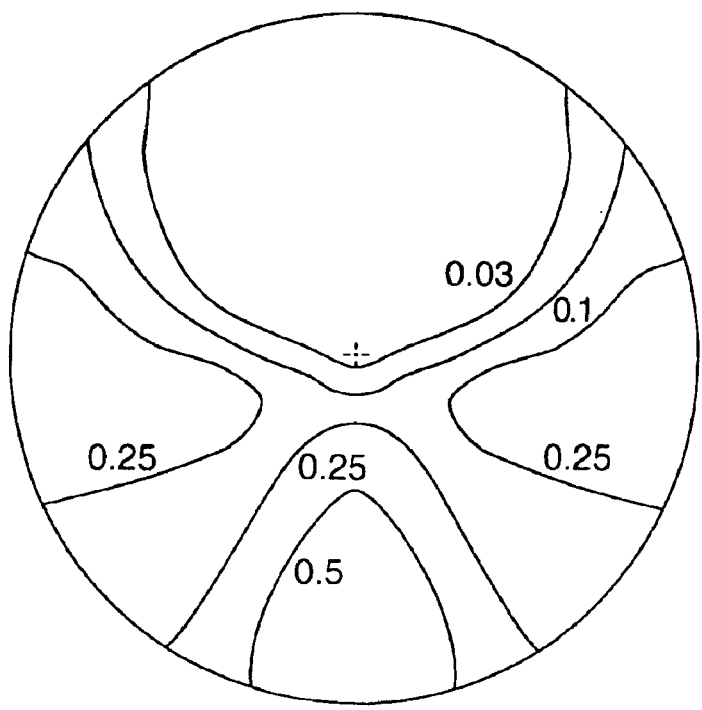
FIG. 3b is a power map of the regressive surface used in the lens of Example 1.

A hard design regressive surface design was produced for a convex surface as a sag table wherein $Z_2$ denoted the sag value departure from a base curvature of 5.22 diopters for the distance zone. In FIGS. 3a and 3b are depicted the cylinder and power contours for this surface. The add power was −0.53 diopter, the channel length was 10.2 mm and the maximum, localized unwanted astigmatism was 0.71 diopters at x=−10 mm and y=−10 mm. The prism reference point used was x=0 and y=0 and the RI was 1.56.

Figure 4A:
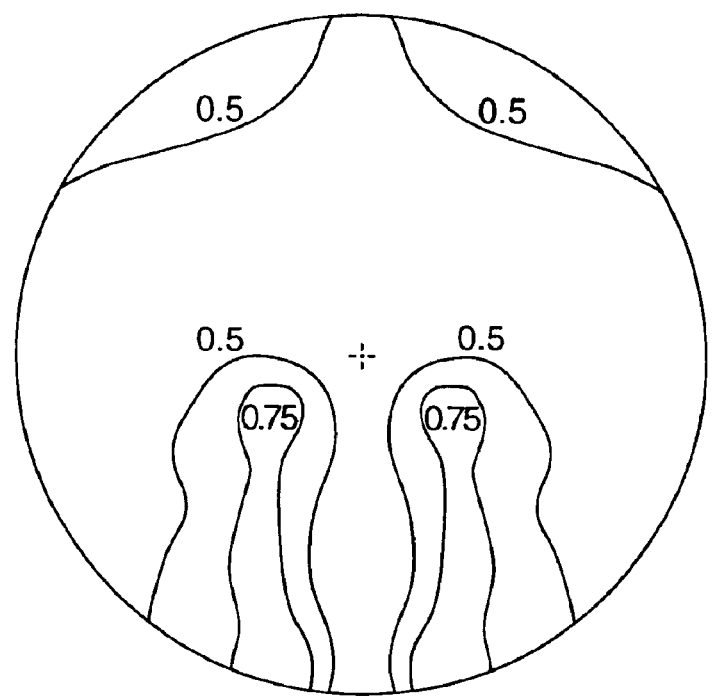
FIG. 4a is a cylinder contour of the composite surface of Example 1.
Figure 4B:
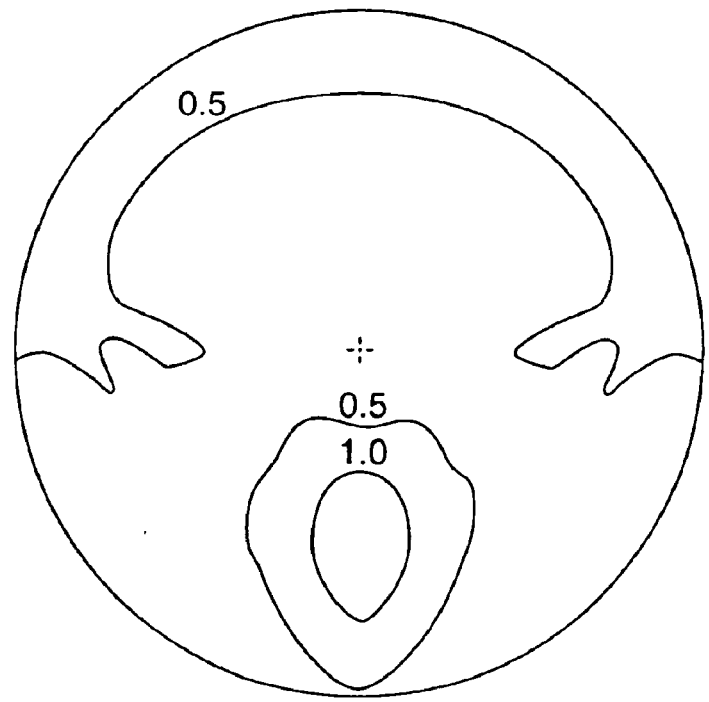
FIG. 4b is the power contour of the composite surface of Example 1.

A convex composite surface design was produced using Equation III wherein $a_1=a_2=1$ to generate the sag value departures. In FIGS. 4a and 4b are depicted the cylinder and power contours for the composite surface, which surface has a base curvature of 5.23 diopters and an add power of 1.28 diopters. The composite surface contains a single maximum, localized unwanted astigmatism area located on either side of the channel. The magnitude of this astigmatism maximum was 0.87 diopters and the channel length is 13.0 mm. The composite surface's area of astigmatism was located at x=−10 mm and y=−18 mm. The maximum astigmatism and normalized distortion of the composite surface was significantly lower, without compromise of the other optical parameters, than that of comparable dioptric add power prior art lenses. For example, a Varilux COMFORT® lens has a maximum astigmatism value and normalized distortion of 1.41 diopters and 361, respectively for a 1.25 diopter add power as shown in Table 2. For a composite surface lens the maximum astigmatism is 0.87 diopters and the normalized lens distortion of the lens is calculated to be 265.

Example 2

Figure 5:
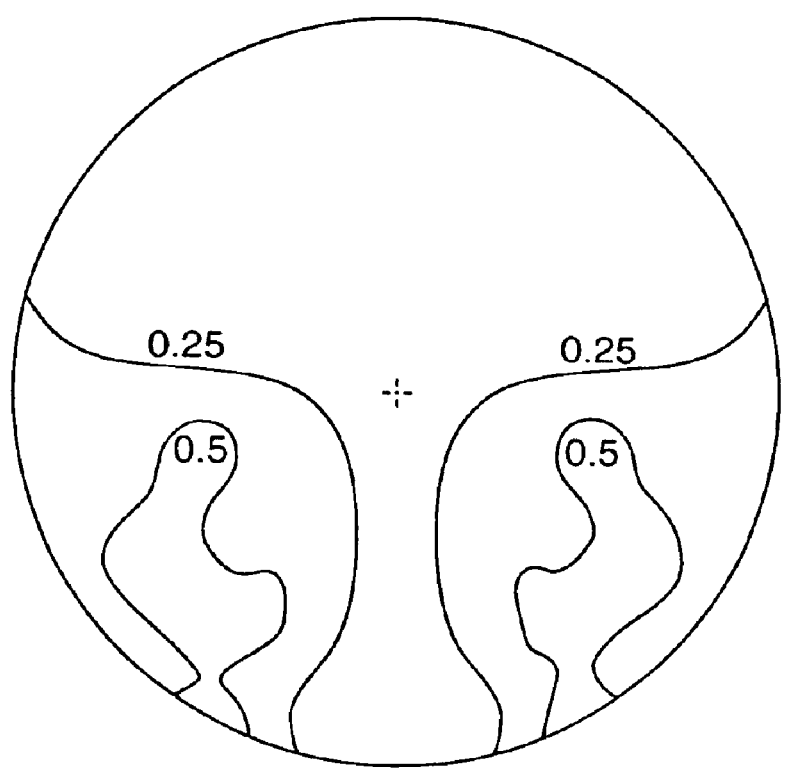
FIG. 5 is the cylinder contour of the concave progressive surface of Example 2.

A concave progressive addition surface was designed using a material refractive index of 1.573, a base curvature of 5.36 diopters and an add power of 0.75 diopters. FIG. 5 depicts the cylinder contours of this surface. The maximum, localized astigmatism was 0.66 diopters at x=−16 mm and y=−9 mm. The prism reference point used was at x=0 and y=0.

Figure 6A:
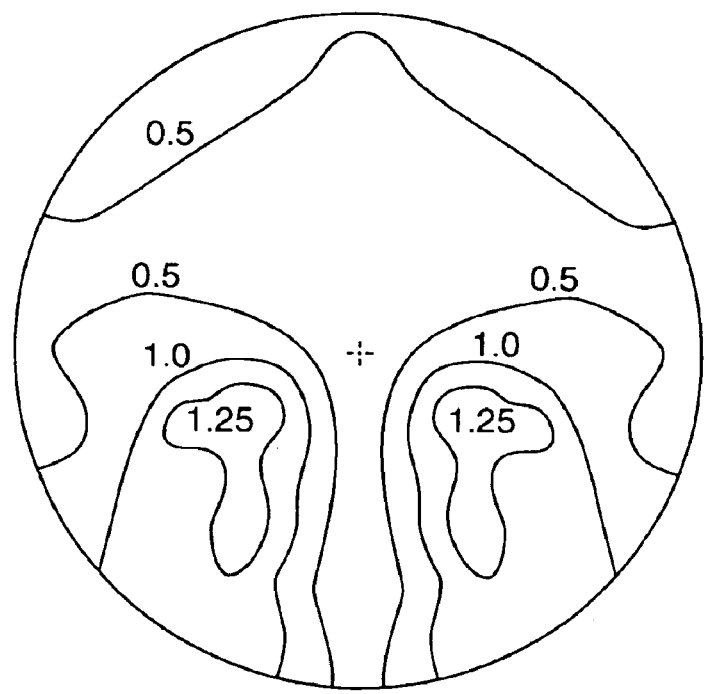
FIG. 6a is the cylinder contour of the lens of Example 2.
Figure 6B:
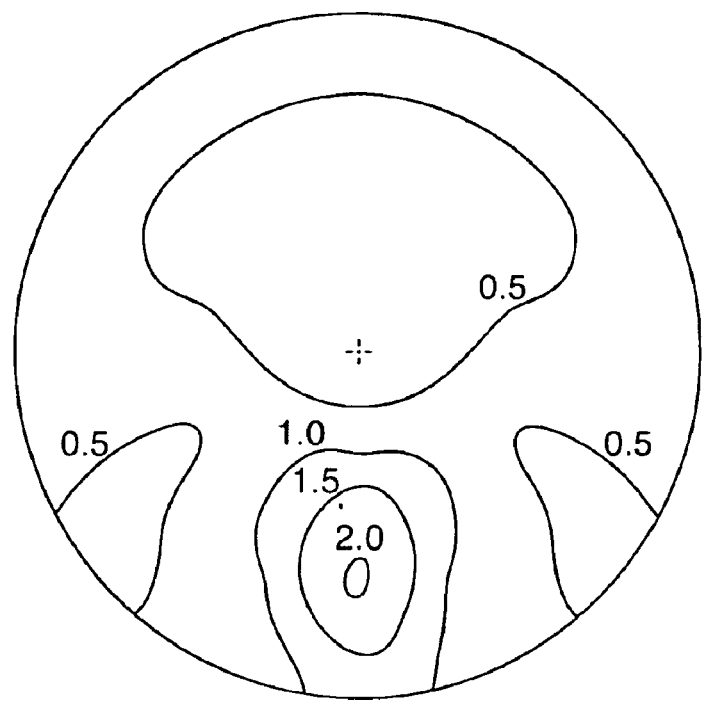
FIG. 6b is the power contour of the lens of Example 2.
Figure 7A:
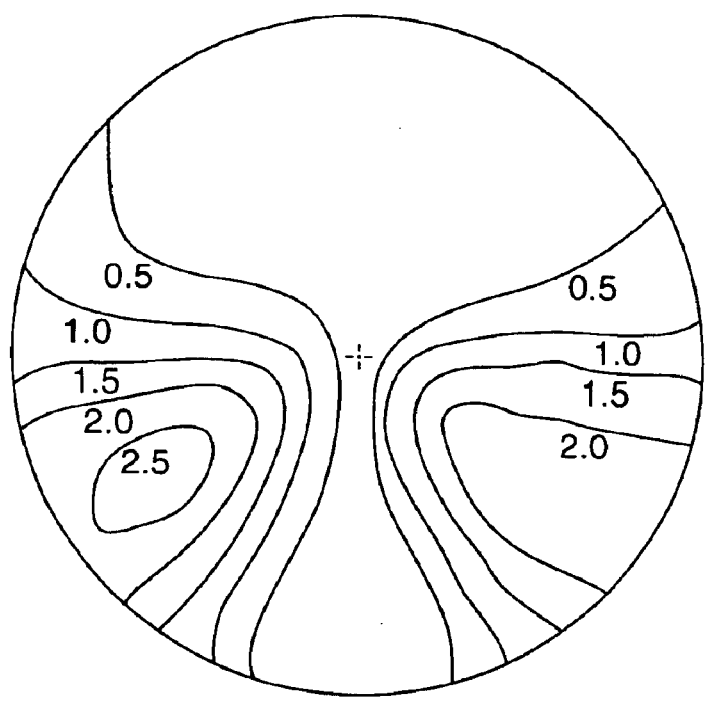
FIG. 7a is the cylinder contour of a conventional lens.
Figure 7B:
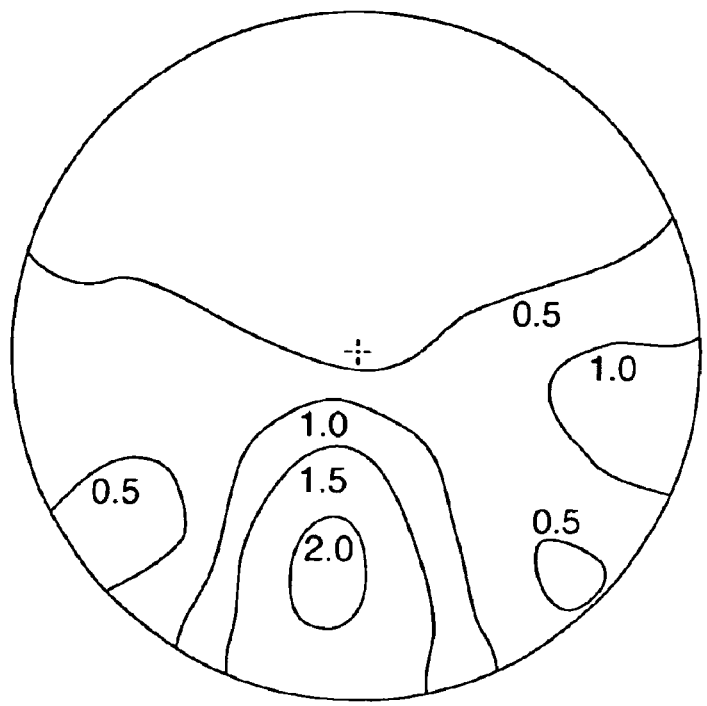
FIG. 7b is the power contour of a conventional lens.

This concave surface was combined with the convex composite surface from Example 1 to form a lens with a distance power of 0.08 diopters and an add power of 2.00 diopters. In the Table is listed the key optical parameters of this lens (Example 2), and in FIGS. 6a and 6b is depicted the cylinder and power contours. The maximum astigmatism is 1.36 diopters, significantly lower than prior art lenses shown in the Table 1 as Varilux COMFORT® (Prior Art Lens 1 and FIGS. 7a and 7b. The normalized lens distortion of the lens is calculated to be 287, significantly less than the prior art lenses of Table 3. Additionally, none of the other optical parameters are compromised.

Example 3

Figure 8:
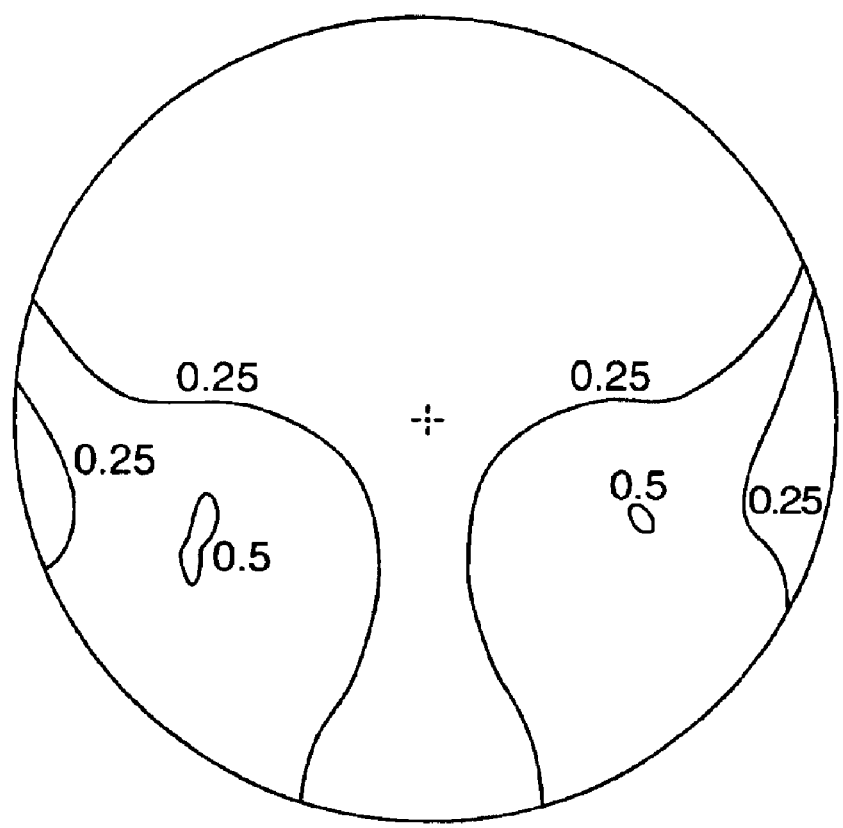
FIG. 8 is the cylinder contour of the concave progressive addition surface of the lens of Example 3.

In order to demonstrate the capability of the design approach of the invention to optimize specific optical parameters, specifically the reading power width, a concave progressive addition surface was designed using a material RI of 1.573, a base curvature of 5.4 diopters and an add power of 0.75 diopters. In FIG. 8 is depicted the cylinder contour of this surface. The maximum, localized astigmatism was 0.51 diopters at x=−15 mm and y=−9 mm. The prism reference point used was at x=0 and y=0.

Figure 9A:
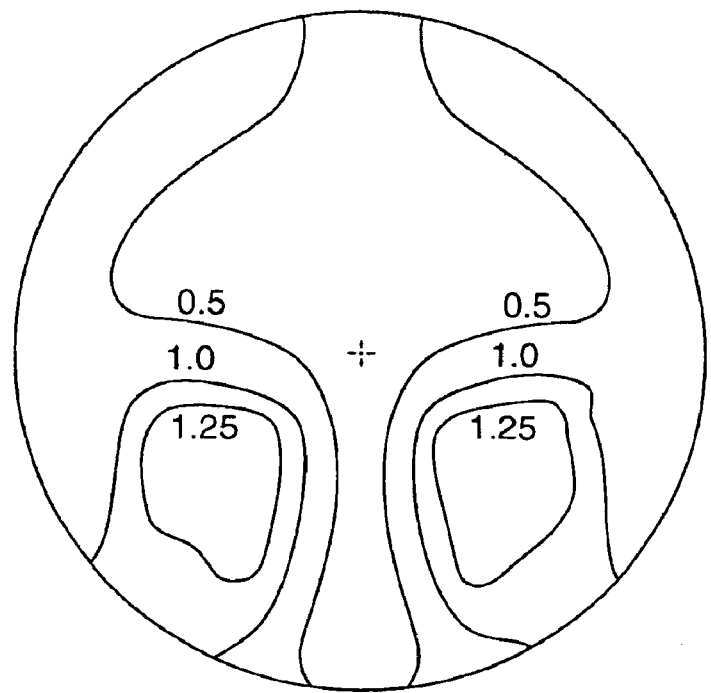
FIG. 9a is the cylinder contour of the lens of Example 3.
Figure 9B:
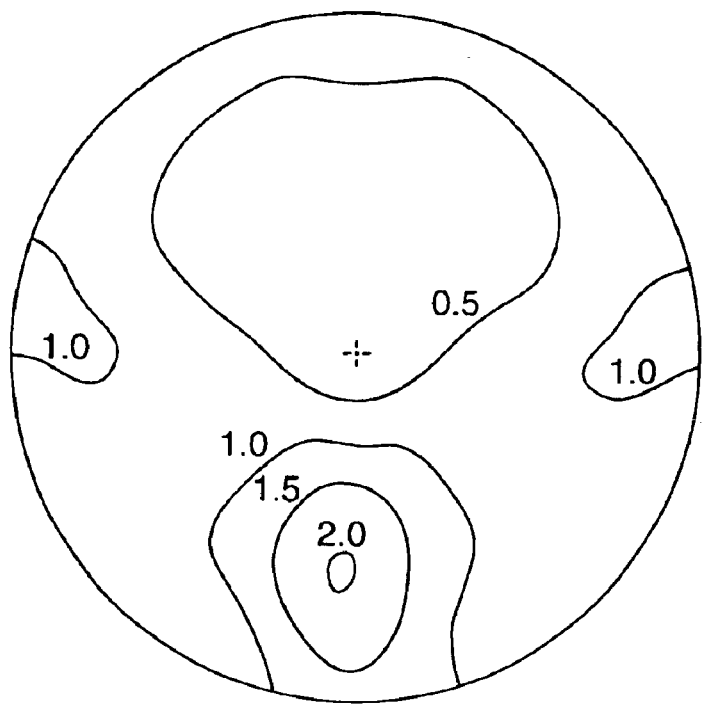
FIG. 9b is the power contour of the lens of Example 3.

This concave surface was combined with the convex composite surface from Example 1 to form a lens with a distance power of 0.05 diopters and an add power of 2.00 diopters. In the Table is listed the key optical parameters of this lens (Example 3), and in FIGS. 9a and 9b is shown the cylinder and power contours. The maximum astigmatism is 1.37 diopters, significantly lower than the prior art lens shown in Table 1 as Varilux COMFORT®—(Prior Art Lens 1 and FIGS. 7a and 7b. The normalized lens distortion of the lens is calculated to be 289, which is significantly less than the prior art lenses of Table 3. The lower astigmatism of the concave surface smoothens out the astigmatic contours and increases the reading power width from 7.4 mm to 8.6 mm. None of the other optical parameters are compromised.

TABLE 1

| Optical Parameter | Prior Art Lens 1 | Example 2 | Example 3 |
|---|---|---|---|
| Distance Power (D) | 0.00 | 0.00 | 0.00 |
| Add Power (D) | 1.99 | 2.01 | 2.01 |
| Distance Width (mm) | 13.5 | 12.6 | 12.6 |
| Reading Width (mm) | 17.6 | 14.6 | 15.2 |
| Reading Power Width (mm) | 13.9 | 7.4 | 8.6 |
| Channel Length (mm) | 12.2 | 12.4 | 12.2 |
| Channel Width (mm) | 6.3 | 8.9 | 8.8 |
| Max. Astig. Location (x, y in deg.) | 16.8–12.1 | 12.5–14.9 | 11.3–11.1 |
| Max. Astigmatism (D) | 2.46 | 1.36 | 1.37 |

TABLE 2

| | Varilux COMFORT® | Example 1 |
|---|---|---|
| Label Add Power (D) | 1.25 | 1.25 |
| $A_P$ (D) | 1.40 | 1.28 |
| $D_W$ (mm) | 45.65 | 30.00 |
| $I_W$ (mm) | 5.00 | 5.32 |
| $N_W$ (mm) | 7.50 | 9.27 |
| $I_L$ (mm) | 11.25 | 8.00 |
| Channel Length (mm) | 12.85 | 13.00 |
| $M_A$ (D) | 1.41 | 0.87 |
| Distortion Area (mm$^2$) | 1075 | 1168 |
| $D_L$ | 361 | 265 |

TABLE 3

| | Varilux COMFORT® | Rodenstock MULTI-GRESSIV® | Zeiss GRADAL® | Hoya EX® | Varilux PANAMIC® | Sola PERCEPTA® | Example 2 | Example 3 |
|---|---|---|---|---|---|---|---|---|
| Label Add Power (D) | 2.00 | 2.00 | 2.00 | 2.00 | 2.00 | 2.00 | 2.00 | 2.00 |
| $A_P$ (D) | 1.99 | 2.11 | 2.21 | 2.28 | 2.19 | 2.12 | 2.01 | 2.01 |
| $D_W$ (mm) | 13.50 | 10.20 | 14.45 | 13.05 | 10.25 | 14.20 | 12.60 | 12.60 |
| $I_W$ (mm) | 3.00 | 4.00 | 3.75 | 4.00 | 6.50 | 2.75 | 3.50 | 4.00 |
| $N_W$ (mm) | 10.00 | 10.00 | 5.50 | 6.00 | 14.90 | 11.50 | 8.00 | 8.00 |
| $I_L$ (mm) | 8.75 | 8.75 | 10.00 | 12.50 | 8.75 | 8.75 | 8.75 | 8.75 |
| Channel Length (mm) | 12.20 | 12.45 | 12.90 | 13.05 | 12.20 | 12.50 | 12.40 | 12.20 |
| $M_A$ (D) | 2.46 | 2.56 | 2.20 | 2.45 | 2.25 | 2.53 | 1.36 | 1.37 |
| Distortion Area (mm$^2$) | 1241 | 1246 | 1286 | 1276 | 1129 | 1209 | 1272 | 1270 |
| $D_L$ | 511 | 504 | 427 | 457 | 387 | 481 | 287 | 289 |

What is claimed is:

1. A method for designing a progressive addition surface of a progressive addition lens comprising the steps of: a.) designing a progressive surface comprising at least one first area of unwanted astigmatism; b.) designing a regressive surface comprising at least one second area of unwanted astigmatism; and c.) combining the progressive and regressive surface designs to form a composite progressive surface design formed on at least one of the front and back surfaces of the lens, wherein the at least one first and second areas of unwanted astigmatism are substantially aligned.

2. The method of claim 1, wherein each of the progressive and regressive surface designs is one of a hard design, a soft design, or a combination thereof.

3. The method of claim 1, wherein each of the progressive and regressive surface designs are hard designs.

4. The method of claim 1, wherein each of the progressive and regressive surface designs are soft designs.

5. The method of claim 1, wherein a surface formed from the composite surface design exhibits maximum, localized unwanted astigmatism that is less than about 0.125 diopters than the sum of an absolute value of the maximum, localized unwanted astigmatism of each of the progressive and regressive surfaces.

6. The method of claim 1, wherein the composite surface design comprises more than one area of maximum, localized unwanted astigmatism on each side of a composite surface's channel.

7. The method of claim 1, wherein the progressive and regressive surface designs are expressed as sag departures from a base curvature.

8. The method of claim 7, wherein the base curvature is a concave curvature or a convex curvature.

9. The method of claim 1, wherein step c.) is carried out by summing a progressive surface and regressive surface design sag values according to the following equation:

$$Z(x, y) = \Sigma a_i Z_i(x, y)$$

wherein Z is the composite surface sag value departure from a base curvature at point (x, y), $Z_i$ is the sag departure for the ith surface to be combined at point (x, y) and $a_i$ are coefficients.

* * * * *